United States Patent Office 3,452,037
Patented June 24, 1969

---

3,452,037
N-[O-(2-OXAZOLIN-2YL)PHENYL]ALKYL OR ARYL SULFONAMIDES AND INTERMEDIATES IN THE PRODUCTION THEREOF
Arthur A. Santilli, Ardmore, Del., and Thomas S. Osdene, Berwyn, Chester, Pa., assignors to American Home Products Corporation, New York, N.Y., a corporation of Delaware
No Drawing. Division of application Ser. No. 437,262, Mar. 4, 1965. Continuation-in-part of application Ser. No. 330,251, Dec. 13, 1963. This application Oct. 3, 1966, Ser. No. 600,678
Int. Cl. C07d *85/24;* C07c *103/20;* A61k *27/00*
U.S. Cl. 260—307
9 Claims

ABSTRACT OF THE DISCLOSURE

This invention concerns N-[o-(2-oxazolin-2-yl)phenyl] alkyl or aryl sulfonamides and related compounds which are pharmacologically active as tranquilizers, antidepressants, anticonvulsants and analgesics.

---

This application is a division of my prior, copending application, Ser. No. 437,262, filed Mar. 4, 1965 now abandoned. This application is also in part a continuation of our previous application Ser. No. 330,251 filed Dec. 13, 1963 and now abandoned.

The invention herein disclosed relates to compositions of matter classified in the art of chemistry as sulfonamidophenyloxazolines and to processes and intermediates for making such compositions.

The invention sought to be patented, in its principal composition aspect, resides in the concept of a chemical compound having a molecular structure in which there is attached to the 2-position of the 2-oxazoline ring an o-(alkylsulfonamido or arylsulfonamido)phenyl group.

A second composition aspect resides in the concept of chemical compounds suitable as intermediates in the production of the principal composition aspect of the invention and which have the 2-aminobenzamide nucleus to which is attached on the nitrogen atom of the amide group a hydroxyethyl group.

The invention sought to be patented, in its process aspect, resides in the concept of a sequence of reactions including: condensing a 2-amino-N-(2-hydroxyethyl)benzamide and cyclizing with a hydrocarbon sulfonyl halide to form a 2-oxazoline having in the 2-position of the ring an o-(hydrocarbonsulfonamido)phenyl group.

The tangible embodiments of the principal composition aspect of this invention possesses the inherent physical properties of being crystalline solids, are substantially insoluble in water, and are generally soluble in polar solvents such as lower aliphatic alcohols. Examination of compounds produced according to the hereinafter described process reveals data confirming the molecular structure hereinbefore set forth.

The tangible embodiments of the invention possess the inherent applied use characteristic of exerting qualitatively varying therapeutic effects in experimental animals as evidenced by pharmacological evaluation according to standard test procedures. These tangible embodiments show hypoglycemic, anticonvulsant and analgesic properties.

In addition to their inherent applied use characteristics, certain of the compounds encompassed by the composition aspect of this invention are useful as intermediates in the production of N-[o-(1-alkyl-2-imidazolin-2-yl)phenyl]-p-toluenesulfonamides, which exert anti-Parkinsonian activity as evidenced by standard test procedures.

The tangible embodiments of the composition aspect of the invention also possess the inherent applied use characteristic of exerting qualitatively varying therapeutic effects in experimental animals as evidenced by pharmacological evaluation according to standard test procedures. These tangible embodiments show tranquilizing activity, antidepressant activity, anticonvulsant activity, anti-Parkinsonian activity, and analgesic activity.

The manner and process of making and using the invention will now be generally described so as to enable a person skilled in the art of chemistry to make and use the same.

The new processes of our invention are illustrated schematically for a specific embodiment thereof in Scheme A, below, and more generally in Scheme B, to which the numerals in parentheses in the following description refer.

The 2-amino-N-(2-hydroxyethyl)benzamide (2), (5) starting material can be prepared according to the following general procedure which involves heating an isatoic anhydride (1) (4) with an ethanolamine yielding the 2-amino-N-(2-hydroxyethyl)benzamide. The 2-amino-N-(2-hydroxyethyl)benzamide is reacted with p-toluenesulfonyl chloride in pyridine to form an N-[o-(2-oxazolin-2-yl) phenyl]alkyl or arylsulfonamide (3), (6). The latter reaction is preferably carried out in the cold. Water is added to precipitate the product which can generally be recrystallized from a lower aliphatic alcohol.

Scheme A

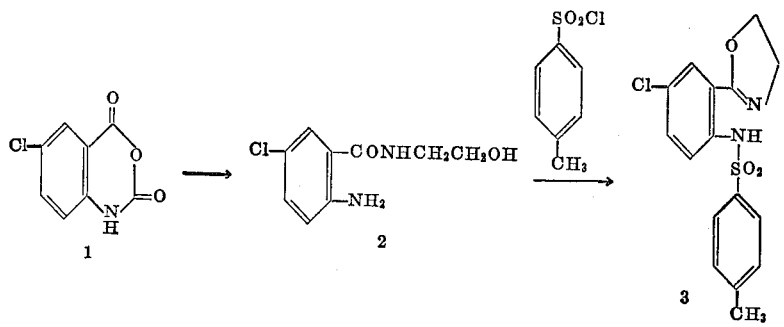

Scheme B

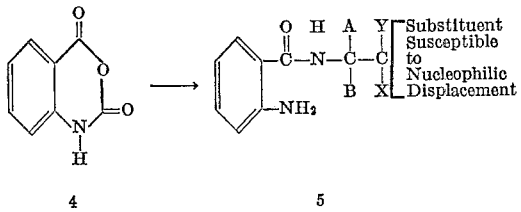 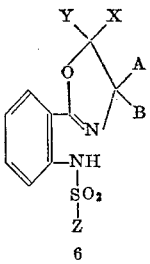

The best mode contemplated by the inventors to carry out their invention will now be set forth as follows:

EXAMPLE 1

(A) Preparation of starting material

Add 9.85 g. of 5-chloroisatoic anhydride to a solution of 4 g. of ethanolamine in 50 ml. of water. Heat the reaction mixture for 20 minutes on a steam bath. Recrystallize from water to yield 2-amino-N-(2-hydroxyethyl)-5-chlorobenzamide, M.P. 121–122.5°.

(B) Preparation of N-[4-chloro-2-(2-oxazolin-2-yl)phenyl]-p-toluenesulfonamide

Add 10.3 g. of p-toluenesulfonyl chloride in portions to an ice-cold solution of 5.8 g. of 2-amino-N-(2-hydroxyethyl)-5-chlorobenzamide in 30 ml. of dry pyridine. Allow the reaction mixture to stand overnight in the refrigerator. After that time, pour the mixture into 50 ml. of water to obtain an oily layer. Wash the oily layer several times with water to obtain a solid mass weighing 9.6 g., M.P. 112–119°. Add this material to 30 ml. of ethanol and heat on the steam bath for 20 minutes. After cooling in ice, wash the product with hot water and filter. Recrystallize from ethanol to obtain N-[4-chloro-2-(2-oxazolin - 2 - yl)phenyl]-p-toluenesulfonamide, M.P. 174–6°.

The isatoic anhydrides and ethanolamines employed in making the 2-amino-N-(2-hydroxyethyl)benzamides used in our process are known or are readily prepared by procedures known to those skilled in the art.

It will be apparent from the disclosure herein to those skilled in the art of organic chemistry that the cyclization reaction occurring in the process aspect of the invention can occur with any 2-amino-N-(2-substituted-ethyl)benzamide as long as the substituent on the 2-position of the ethyl radical is susceptible to nucleophilic displacement. Among such substituents, and without limiting the generality of the foregoing are the chloride, bromine, and iodine atoms, and the tosyl group.

It will also be apparent to those skilled in the art to which the invention appertains that certain of the carbon and nitrogen atoms of the starting benzamide can be substituted with groups which do not interfere with the cyclization reaction. Therefore, in the process of the invention, all such benzamides can be employed as starting materials in the process of making aspect of this invention.

Similarly, the benzenoid moiety can have on any available position on the ring one or more non-interfering substituents, as for example but without limitation, alkyl, halogen, haloalkyl, sulfamyl, and alkylsulfamyl. Furthermore, the nitrogen of the amino group (Scheme B; Z) can be substituted with a hydrocarbon radical borne by a sulfonyl group such as alkyl or alkylphenyl or aralkyl such as tolyl or aryl such as phenyl. The phenyl sub-groups can also bear the same substituents as the benzenoid moiety. The ethyl moiety of the N-(2-substituted-ethyl)benzamide can be substituted (Scheme B; A, B, X and Y) with alkyl groups, as for example, but without limitation, methyl, ethyl, propyl, isopropyl, n-butyl, t-butyl or isoamyl; phenyl groups and phenyl groups bearing the same non-interfering substitutents as the benzenoid moiety; or cyclized lower alkyl radicals such as cyclopropyl, cyclobutyl and cyclopentyl.

When the starting benzamides are substituted as hereinbefore recited, it will be apparent to those skilled in the art that the final products formed by the process of the invention will bear the same substituents.

It will also be apparent to those skilled in the art of chemistry that the oxygen atom in the 1-position of the oxazoline ring in the final products (Scheme B, 6) can be replaced by a sulfur atom.

Compounds bearing the hereinbefore recited substituents are fully equivalent to the compositions of matter particularly claimed herein.

As part of this invention, it should also be noted that a 2-anilino-N-(2-hydroxyethyl)benzamide, prepared as the above described 2-amino-N-(2-hydroxyethyl)benzamide but using N-phenylisatoic anhydride, can be dehydrated to cause ring closure thereof, thereby forming a 2-(o-anilinophenyl)-2-oxazoline. This dehydration is effected at a temperature of about 0 to about 10° C. by adding a dehydrating agent to a cold solution of the starting benzamide. After the reaction mixture reaches room temperature, ice is added thereto to precipitate the product.

The following examples further illustrate the details of the claimed invention, all melting points being in degrees centigrade.

EXAMPLE 2

2-amino-5-chloro-N-(β-hydroxyphenethyl)benzamide

Add 9.9 g. of 5-chloroisatoic anhydride to a solution of 6.9 g. of β-hydroxyphenethylamine in 20 ml. of ethanol. Heat the reaction mixture on the steam bath for several minutes and allow to stand overnight at room temperature. Remove the solvent in a rotary evaporator. Allow the oily residue to crystallize on cooling. Recrystallize from benzene to yield 2-amino-5-chloro-N-(β-hydroxyphenethyl)benzamide, M.P. 119–121°.

This compound has depressant activity.

EXAMPLE 3

2-amino-5-chloro-N-(2-hydroxypropyl)benzamide

Add 19.7 g. of 5-chloroisatoic anhydride to a solution of 7.5 g. of 1-amino-2-propanol in 50 ml. of ethanol. Heat the reaction mixture for 5 minutes on the steam bath. Remove the solvent on a rotary evaporator. Induce crystallization of the oily residue by cooling and scratching. Recrystallize from benzene to yield 2-amino-5-chloro-N-(2-hydroxypropyl)benzamide, M.P. 109–110.5°.

This compound has anticonvulsant, antitremorine and depressant activities.

EXAMPLE 4 o-Chloromandelonitrile acetate

Boil a mixture of 134 g. of o-chloromandelonitrile and 82 g. of acetic anhydride under reflux for 2 hours. Distill the reaction mixture in vacuo to yield 107 g. of o-chloromandelonitrile acetate, B.P. 100–111° (0.25 mm.).

EXAMPLE 5 o-Chloro-β-hydroxyphenethylamine

To a cooled and stirred suspension of 37.8 g. of lithium aluminum hydride in 800 ml. of anhydrous tetrahydrofuran add dropwise 107 g. of o-chloromandelonitrile acetate. Allow the reaction mixture to warm up to room temperature and boil under reflux for 2 hours. Cool the reaction mixture in ice and add 100 ml. of water dropwise, followed by 200 ml. of 20% sodium hydroxide. After allowing to stand overnight, filter the reaction mixture. Remove the solvent on a rotary evaporator. Distill the residue in vacuo to yield 56 g. of o-chloro-β-hydroxyphenethylamine, B.P. 108–112° (0.25 mm.).

EXAMPLE 6

2-amino-5-chloro-N-(o-chloro-β-hydroxyphenethyl)-benzamide

Add 19.7 g. of 5-chloroisatoic anhydride to a solution of 18.9 g. of o-chloro-β-hydroxyphenethylamine in 50 ml. of ethanol. Heat the reaction mixture on the steam bath for 15 minutes and then filter. Remove the solvent on a rotary evaporator. Wash the gummy residue with cyclohexane and benzene. Recrystallize from a benzene-cyclohexane mixture to yield 2-amino-5-chloro-N-(o-chloro-β-hydroxyphenethyl)benzamide, M.P. 105–107°.

This compound has analgesic and depressant activities.

EXAMPLE 7

2-amino-N-(o-chloro-β-hydroxyphenethyl)benzamide

Add 16.3 g. of isatoic anhydride to a solution of 18.8 g. of o-chloro-β-hydroxyphenethylamine in 50 ml. of ethanol. Heat the reaction mixture for 15 minutes on the steam bath. Filter and remove the solvent on a rotary evaporator. Induce crystallization of the oily residue by cooling and scratching the sides of the vessel. Recrystallize from a mixture of benzene and cyclohexane to obtain a product weighing 17.5 g., M.P. 93–100°. Recrystallize a second time from benzene-cyclohexane to yield 2-amino-N-(o-chloro-β-hydroxyphenethyl)benzamide, M.P. 103–5°.

This compound has central nervous system depressant activity.

EXAMPLE 8

2-amino-N-(2-chloroethyl)-5-chlorobenzamide

Boil a solution of 3.4 g. of 2-amino-N-(2-hydroxyethyl)-5-chorobenzamide in 25 ml. of thionyl chloride under reflux for 1 hour. Remove the excess thionyl chloride in vacuo on a rotary evaporator. Induce crystallization of the oily residue by cooling and scratching to yield 3 g. of solid, M.P. 180–190°. Dissolve the product in 10 ml. of hot water and make the solution basic with 10% sodium carbonate solution. Recrystallize the crystalline product which deposits from cyclohexane, to yield 2-amino-N-(2-chloroethyl)-5-chlorobenzamide, M.P. 115–116°.

EXAMPLE 9

N-phenylisatoic anhydride

Boil a solution of 5 g. of N-phenylantranilic acid in 20 ml. of ethyl chloroformate under reflux for 10 hours. Remove the excess ethyl chloroformate in vacuo on a rotary evaporator to give a residual solid, M.P. 172–179°. Recrystallize from ethanol to give N-phenylisatoic anhydride, M.P. 177–179°.

EXAMPLE 10

2-anilino-N-(2-hydroxyethyl)benzamide

Add 2.6 g. of ethanolamine to a solution of 10 g. of N-phenylisatoic anhydride in 50 ml. of absolute ethanol. Heat the reaction mixture for 10 minutes on the steam bath. Remove the ethanol in vacuo on a rotary evaporator to give a solid residue, M.P. 62–70°. Recrystallize from benzene-cyclohexane to give 2-anilino-N-(2-hydroxyethyl)benzamide, M.P. 77–9°.

This compound has depressant, anticonvulsant, and antitremorine activities.

EXAMPLE 11

5-chloro-N-(o-chloro-β-hydroxyphenethyl)-2-(p-tolylsulfonamido)benzamide

Add in portions 23 g. of p-toluenesulfonyl chloride to an ice-cold solution of 20 g. of 2-amino-N-(o-chloro-β-hydroxyphenethyl)-benzamide in 40 ml. of absolute pyridine. Allow the reaction mixture to stand overnight in the refrigerator and then pour into 200 ml. of water to obtain an oily layer. Wash the oily layer several times with water. Induce crystallization by adding methanol to obtain 23 g. of solid, M.P. 70–92°. Recrystallize from benzene to give 5-chloro-N-(o-chloro-β-hydroxyphenethyl)-2-(p-tolylsulfonamido)benzamide, M.P. 165–166°.

The following examples illustrate the preparation of chemical compounds encompassed by the principal composition aspect of the invention sought to be patented, starting with the compounds prepared by the preceding examples.

EXAMPLE 12

2-(2-amino-5-chlorophenyl)-2-oxazoline

Add 4 g. of finely pulverized sodium carbonate to a solution of 6.2 g. of 2-amino-N-(2-chloroethyl)-5-chlorobenzamide in 15 ml. of dimethylformamide. Heat the reaction mixture under reflux for 1½ hours. Filter and add water to the filtrate until the precipitation of the product is complete. Recrystallize from n-hexane to yield 3.2 g. of 2-(2-amino-5-chlorophenyl)-2-oxazoline, M.P. 76–8°.

This compound has antidepressant, anticonvulsant, antitremorine and tranquilizing activities.

EXAMPLE 13

N-[4-chloro-2-(5-phenyl-2-oxazolin-2-yl)phenyl] p-toluenesulfonamide

Add 21 g. of p-toluenesulfonyl chloride in small portions and with cooling to a solution of 16 g. of 2-amino-5-chloro-N-(β-hydroxyphenethyl)benzamide in 35 ml. of dry pyridine. (The reaction temperature should be maintained between 5 and 10°.) Allow the reaction mixture to stand overnight in the refrigerator and then pour into 200 ml. of water to obtain an oily layer. Wash the oily layer several times with water to obtain a solid mass weighing 24 g., M.P. 65–95°. Recrystallize from methanol to obtain N-[4-chloro-2-(5-phenyl-2-oxazolin-2-yl)phenyl] p-toluenesulfonamide, M.P. 132–3°.

This compound has central nervous system depressant activity.

EXAMPLE 14

N-[4-chloro-2-(5-phenyl-2-oxazolin-2-yl)phenyl]-α-toluenesulfonamide

Add 4.95 g. of alpha-toluenesulfonyl chloride portionwise to an ice-cold solution of 3 g. of 2-amino-5-chloro-N-(β-hydroxy-phenethyl)benzamide in 15 ml. of dry pyridine. Allow solution to stand 3 hours at 5°. Pour the reaction mixture into 100 ml. of water to obtain an oily residue. Wash the residue with water and finally methanol, to obtain a solid mass, weighing 3.5 g., M.P. 134–140°. Recrystallize from cyclohexane to obtain N-[4-chloro-2-(5-phenyl-2-oxazolin-2-yl)phenyl] - alpha - toluenesulfonamide, M.P. 139–140°.

This compound has central nervous system depressant activity.

EXAMPLE 15

N-[4-chloro-2-(5-phenyl-2-oxazolin-2-yl)phenyl] methanesulfonamide

Add dropwise 1.97 g. of methanesulfonyl chloride to an ice-cold solution of 2.5 g. of 2-amino-5-chloro-N-(β-hydroxyphenethyl)benzamide in 10 ml. of dry pyridine, keeping the reaction temperature below 17°, during the addition. Add ice after the reaction mixture warms up to room temperature. Wash the gelatinous precipitate which deposits several times with water. Induce crystallization by the addition of 5 ml. of cold methanol to obtain 1.5 g. of product, M.P. 149–152°. Recrystallize from methanol to obtain N-[4-chloro-2-(5-phenyl-2-oxazolin-2-yl)phenyl] methanesulfonamide, M.P. 157–158°.

This compound has depressant activity.

EXAMPLE 16

N-[4-chloro-2-(5-methyl-2-oxazolin-2-yl) phenyl]-p-toluenesulfonamide

Add 8.4 g. of p-toluenesulfonyl chloride portionwise to an ice-cold solution of 5 g. of 2-amino-5-chloro-N-(2-hydroxypropyl)benzamide in 20 ml. of dry pyridine. Allow the reaction mixture to stand overnight and then pour into 300 ml. of water. Wash the resulting oily layer several times with water, and finally with cold ethanol to obtain a product amounting to 4 g., M.P. 110–113°. Dissolve three and one-half grams of this product in 25 ml. of dry methanol and add 0.5 g. of sodium methoxide. Boil the reaction mixture under reflux for 10 minutes to deposit a solid. Cool the reaction mixture in ice and remove the solid material by filtration. Wash the product several times with water, and recrystallize from methanol to obtain 1.3 g. of N-[4-chloro-2-(5-methyl-2-oxazolin-2-yl) phenyl]-p-toluenesulfonamide, M.P. 122–124°.

This compound has hypoglycemic and antidepressant activities.

EXAMPLE 17

N-[4-chloro-2-(5-methyl-2-oxazolin-2-yl) phenyl]methanesulfonamide

Add dropwise 5 g. of methanesulfonyl chloride to an ice-cold stirred solution of 5 g. of 2-amino-5-chloro-N-(2-hydroxypropyl)benzamide in 20 ml. of dry pyridine. Regulate the rate of addition so as to keep the reaction temperature below 15°. Allow the reaction mixture to stand at room temperature overnight, and pour into 300 ml. of water to obtain an oily layer. Wash this layer several times with water to obtain a semicrystalline product. Recrystallize from aqueous ethanol to obtain 1.5 g. of N-[4-chloro-2-(5-methyl-2-oxazolin-2-yl)phenyl] methanesulfonamide, M.P. 114–116°.

This compound has depressant activity.

EXAMPLE 18

N-[4-chloro-2-(5-o-chlorophenyl-2-oxazolin-2-yl)phenyl]-p-toluenesulfonamide

Add dropwise 12.6 g. of methanesulfonyl chloride to an ice-cold solution of 5.2 g. of 5-chloro-N-(o-chloro-β-hydroxyphenethyl)-2-(p - tolylsulfonamido)benzamide in 10 ml. of anhydrous pyridine. Add at such a rate so that the reaction temperature never exceeds 20°. Allow the reaction mixture to stand overnight at room temperature and then treat with ice. Extract the reaction mixture several times with benzene and remove the solvent in the rotary evaporator. Triturate the oily residue with petroleum ether to obtain a solid amounting to 2.0 g., M.P. 155–163°. Recrystallize from benzene-petrol to obtain N-[4-chloro-2-(5-o-chlorophenyl - 2 - oxazolin-2-yl)phenyl]-p-toluenesulfonamide, M.P. 167–168°.

EXAMPLE 19

N-[o-(2-oxazolin-2-yl)phenyl]-p-toluenesulfonamide

Add in portions 19 g. of p-toluenesulfonyl chloride to an ice-cold solution of 2-amino-N-(2-hydroxyethyl)benzamide in 30 ml. of dry pyridine. Allow the reaction mixture to stand overnight in the refrigerator and then pour into 100 ml. of water to obtain an oily residue. Wash the residue several times with water to obtain a crystalline product, 19.6 g., M.P. 94–99°. Add fourteen and one-half grams of this material to 50 ml. of ethanol and heat for 15 minutes on the steam bath. After cooling in ice, wash the crystalline product with 50 ml. of hot water to give 8.5 g., of a material melting at 192–7°. Recrystallize from ethanol to give N-[o-(2-oxazolin-2-yl)phenyl]-p-toluenesulfonamide, M.P. 197–199°.

EXAMPLE 20

2-(o-anilinophenyl)-2-oxazoline

Add dropwise with stirring 1.1 g. of methanesulfonyl chloride to an ice-cold solution of 2.6 g. of 2-anilino-N-(2-hydroxyethyl)benzamide in 5 ml. of dry pyridine, keeping the temperature of the reaction at 0–10°. After the reaction mixture warms up to room temperature, add ice. Remove the solid product by filtration and wash with water to give a product, M.P. 60–64°. Recrystallize from aqueous ethanol to give 2-(o-anilinophenyl)-2-oxazoline, M.P. 66–68°.

This compound has antidepressant activity.

EXAMPLE 21

N-[o-(2-oxazolin-2-yl)phenyl]methanesulfonamide

Add dropwise, 16 ml. of methanesulfonyl chloride to an ice-cold solution of 18 g. of 2-amino-N-(2-hydroxyethyl) benzamide in 50 ml. of dry pyridine. Regulate the rate of addition so that the reaction temperature never exceeds 15°. Allow the reaction mixture to stand overnight at room temperature and treat with ice to form a crystalline product melting at 153–156°. Recrystallize from benzene to obtain N-[o-(2-oxazolin-2-yl)phenyl]methanesulfonamide, M.P. 164–165°.

This compound has analgesic activity.

EXAMPLE 22

N-[o-(5-o-chlorophenyl-2-oxazolin-2-phenyl]-p-toluenesulfonamide

Add in portions 15.3 g. of p-toluenesulfonyl chloride to an ice-cold solution of 12 g. of 2-amino-N-(o-chloro-β-hydroxyphenethyl)benzamide in 35 ml. of anhydrous pyridine. Allow the reaction mixture to stand overnight in the refrigerator and then pour into 200 ml. of water to form an oily layer. Wash this layer several times with water. Induce crystallization by cooling and scratching the residue to give 14 g. of crystals, M.P. 120–130°. Recrystallize from ethanol to give N-[o-(5-o-chlorophenyl-2-oxazolin-2-yl)phenyl]-p-toluenesulfonamide, M.P. 152–153°.

EXAMPLE 23

Preparation of N-[o-(2-thiazolin-2-yl)phenyl]-p-toluenesulfonamide

Add 1 g. of phosphorous pentasulfide to a solution of 1 g. of N-[o-(2-oxazolin-2-yl)phenyl]-p-toluenesulfonamide in 15 ml. of dry pyridine. Heat the reaction mixture under reflux for 2 hours and then pour into 50 ml. of hot water. Neutralize the reaction mixture with 30% hydrochloric acid solution, to cause a yellow crystalline material to deposit out of solution. Recrystallize the product twice from aqueous pyridine to yield N-[o-(2-thiazolin-2-yl)phenyl]-p-toluenesulfonamide, M.P. 160–3°.

The products of this invention may be administered parenterally or orally and may be combined with diluents, solvents, suspending agents, fillers, excipients, adhesives, coloring and flavoring materials, etc., as desired for the preparation of convenient unit dosage forms.

What is claimed is:

1. A process for preparing a compound selected from the group consisting of:

N-[4-chloro-2-(5-phenyl-2-oxazolin-2-yl)phenyl]-p-toluenesulfonamide;

N-[4-chloro-2-(5-phenyl-2-oxazolin-2-yl)phenyl]-α-toluenesulfonamide;

N-[4-chloro-2-(5-phenyl-2-oxazolin-2-yl)phenyl]-methanesulfonamide;

N-[4-chloro-2-(5-methyl-2-oxazolin-2-yl phenyl]-p-toluenesulfonamide;

N-[4-chloro-2-(5-methyl-2-oxazolin-2-yl)phenyl]-methanesulfonamide; and

N-[o-(2-oxazolin-2-yl)phenyl]methanesulfonamide which comprises contacting a compound of the formula:

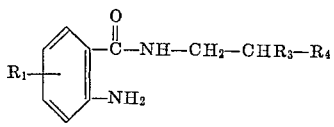

wherein $R_1$ is selected from the group consisting of hydrogen and chloro; $R_3$ is hydrogen, methyl and phenyl; and $R_4$ is a group susceptible to nucleophilic substitution with a sulfonyl halide of the formula:

$$R_2SO_2X$$

wherein $R_2$ is selected from the group consisting of methyl, p-tolyl and α-tolyl; and X is halogen, in an inert solvent under anhydrous conditions.

2. N-[4-chloro-2-(5-phenyl-2-oxazolin - 2 - yl)phenyl]-p-toluenesulfonamide.

3. N-[4-chloro - 2 - (5-phenyl-2-oxazolin-2-yl)phenyl]-methanesulfonamide.

4. N-[4-chloro - 2 - (5-phenyl-2-oxazolin-2-yl)phenyl]-α-toluenesulfonamide.

5. N-[4-chloro - 2 - (5-methyl-2-oxazolin-2-yl)phenyl]-p-toluenesulfonamide.

6. N-[4-chloro-2-(5-methyl - 2 - oxazolin-2-yl)phenyl]-methanesulfonamide.

7. N-[o-(2-oxazolin-2-yl)phenyl]methanesulfonamide.

8. A process for the preparation of a 2-(o-anilinophenyl)-2-oxazoline which comprises contacting a 2-anilino-N-(2-hydroxyethyl)benzamide with a dehydrating agent at a temperature range of about 0° C. to about 10° C.

9. 2-(o-anilinophenyl)-2-oxazoline.

References Cited

UNITED STATES PATENTS 2,114,326  4/1938  Adams et al. _____ 260—307.6

ALEX MAZEL, *Primary Examiner.*

BERNARD I. DENTZ, *Assistant Examiner.*

U.S. Cl. X.R.

260—558; 424—269, 324